US010732361B2

(12) United States Patent
Fortusini et al.

(10) Patent No.: US 10,732,361 B2
(45) Date of Patent: Aug. 4, 2020

(54) OPTICAL PLUG HAVING A TRANSLATING COVER AND A COMPLIMENTARY RECEPTACLE

(71) Applicant: Corning Optical Communications LLC, Hickory, NC (US)

(72) Inventors: Davide Domenico Fortusini, Ithaca, NY (US); Micah Colen Isenhour, Lincolnton, NC (US); James Phillip Luther, Hickory, NC (US); Jürgen Matthies, Wetter (DE); Percil Watkins, Conover, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 369 days.

(21) Appl. No.: 14/976,197

(22) Filed: Dec. 21, 2015

(65) Prior Publication Data

US 2016/0109660 A1 Apr. 21, 2016

Related U.S. Application Data

(63) Continuation of application No. PCT/US2014/042665, filed on Jun. 17, 2014.
(Continued)

(51) Int. Cl.
*G02B 6/38* (2006.01)
*G02B 6/32* (2006.01)

(52) U.S. Cl.
CPC ........... *G02B 6/3849* (2013.01); *G02B 6/325* (2013.01); *G02B 6/387* (2013.01); *G02B 6/3817* (2013.01);
(Continued)

(58) Field of Classification Search
CPC ............... G02B 6/2551; G02B 6/3806; G02B 6/03611; G02B 6/2557; G02B 6/3822; G02B 6/3881; G02B 6/40
See application file for complete search history.

(56) References Cited

U.S. PATENT DOCUMENTS

| 4,213,677 A | 7/1980 | Sugimoto et al. |
| 4,268,112 A | 5/1981 | Peterson |

(Continued)

FOREIGN PATENT DOCUMENTS

| AU | 199898138 B2 | 8/1999 |
| CN | 101828137 A | 9/2010 |

(Continued)

OTHER PUBLICATIONS

Nakagawa et al. "Lens-Coupled Laser Diode Module Integrated on Silicon Platform" Journal of Lightwave Technology vol. 14 No. 6 Jun. 1996, p. 1519-1523.
(Continued)

*Primary Examiner* — Ryan A Lepisto
*Assistant Examiner* — Erin D Chiem
(74) *Attorney, Agent, or Firm* — Michael E. Carroll, Jr.

(57) ABSTRACT

Disclosed are optical plug connectors and optical receptacles for making optical connections. In one embodiment, the optical plug connector includes an optical portion having an optical interface and a cover for protecting the optical interface. The cover can translate toward the optical interface when connecting the optical plug connector and a portion of the cover allows transmission of optical signals therethrough.

45 Claims, 10 Drawing Sheets

Related U.S. Application Data

(60) Provisional application No. 61/839,172, filed on Jun. 25, 2013.

(52) U.S. Cl.
CPC ......... *G02B 6/3821* (2013.01); *G02B 6/3882* (2013.01); *G02B 6/3885* (2013.01)

(56) References Cited

U.S. PATENT DOCUMENTS

| | | | |
|---|---|---|---|
| 4,701,011 A | 10/1987 | Emkey et al. | |
| 4,781,431 A | 11/1988 | Wesson et al. | |
| 5,163,107 A | 11/1992 | Garriss | |
| 5,172,271 A | 12/1992 | Sinclair | |
| 5,384,874 A | 1/1995 | Hirai et al. | |
| 5,548,677 A | 8/1996 | Kakii et al. | |
| 5,784,512 A | 7/1998 | Hensen | |
| 5,832,153 A | 11/1998 | Duck | |
| 5,850,493 A | 12/1998 | Cheng | |
| 5,917,976 A | 6/1999 | Yamaguchi | |
| 5,923,802 A | 7/1999 | Giebel et al. | |
| 6,012,852 A | 1/2000 | Kadar-Kallen et al. | |
| 6,027,253 A | 2/2000 | Ota et al. | |
| 6,033,125 A | 3/2000 | Stillie et al. | |
| 6,157,485 A | 12/2000 | Cheng | |
| 6,240,235 B1 | 5/2001 | Uno et al. | |
| 6,246,026 B1 | 6/2001 | Vergeest | |
| 6,398,424 B1 | 6/2002 | Jin et al. | |
| 6,485,189 B1 | 11/2002 | Gilliland et al. | |
| 6,530,696 B1 | 3/2003 | Ueda et al. | |
| 6,542,665 B2 | 4/2003 | Reed et al. | |
| 6,554,485 B1* | 4/2003 | Beatty | G02B 6/3849 385/70 |
| 6,632,025 B2 | 10/2003 | Ukrainczyk | |
| 6,633,700 B2 | 10/2003 | Bellman et al. | |
| 6,655,850 B2 | 12/2003 | Mann et al. | |
| 6,687,434 B2 | 2/2004 | Ishikawa | |
| 6,724,959 B1 | 4/2004 | Takahashi et al. | |
| 6,736,547 B2 | 5/2004 | Stevens et al. | |
| 6,837,625 B2 | 1/2005 | Schott et al. | |
| 6,848,834 B1 | 2/2005 | Roehrs et al. | |
| 6,899,464 B2 | 5/2005 | Stevens et al. | |
| 6,963,687 B2 | 11/2005 | Vergeest et al. | |
| 7,077,576 B2 | 7/2006 | Luther et al. | |
| 7,104,701 B1 | 9/2006 | Durrant et al. | |
| 7,269,317 B2 | 9/2007 | Blauvelt et al. | |
| 7,329,050 B1 | 2/2008 | Dugan et al. | |
| 7,346,236 B2 | 3/2008 | Asano et al. | |
| 7,346,237 B2 | 3/2008 | Matsumura et al. | |
| 7,357,005 B2 | 4/2008 | Matsumura et al. | |
| 7,460,750 B2 | 12/2008 | Durrant et al. | |
| 7,503,703 B1 | 3/2009 | Thorson | |
| 7,572,071 B1 | 8/2009 | Wu | |
| 7,603,008 B2 | 10/2009 | Matsumura et al. | |
| 7,654,747 B2* | 2/2010 | Theuerkorn | G02B 6/3821 385/53 |
| 7,722,260 B2 | 5/2010 | Fukui et al. | |
| 7,775,725 B2 | 8/2010 | Grinderslev | |
| 7,887,243 B2* | 2/2011 | Abel | G02B 6/2817 385/44 |
| 8,277,130 B2 | 10/2012 | Nishimura et al. | |
| RE44,664 E | 12/2013 | Mccolloch | |
| 8,651,749 B2 | 2/2014 | Dainese Júnior et al. | |
| 8,757,893 B1 | 6/2014 | Isenhour et al. | |
| 8,781,273 B2 | 7/2014 | Benjamin et al. | |
| 9,022,669 B2 | 5/2015 | De Jong et al. | |
| 9,069,142 B2 | 6/2015 | Fortunsini et al. | |
| 9,151,912 B2 | 10/2015 | De Jong et al. | |
| 9,304,265 B2 | 4/2016 | Isenhour et al. | |
| 2001/0021287 A1* | 9/2001 | Jewell | G02B 6/4206 385/14 |
| 2002/0031301 A1 | 3/2002 | Sasaki et al. | |
| 2002/0146211 A1 | 10/2002 | Stevens et al. | |
| 2002/0172474 A1 | 11/2002 | Kim et al. | |
| 2003/0012513 A1 | 1/2003 | Ukrainczyk | |
| 2003/0021543 A1 | 1/2003 | Mann et al. | |
| 2003/0128437 A1 | 7/2003 | Sato et al. | |
| 2004/0009697 A1 | 1/2004 | Clark et al. | |
| 2004/0081405 A1* | 4/2004 | Stevens | G02B 6/32 385/56 |
| 2004/0184738 A1* | 9/2004 | McColloch | G02B 6/3873 385/53 |
| 2005/0176161 A1* | 8/2005 | Bapst | G02B 6/42 438/31 |
| 2006/0222299 A1 | 10/2006 | Durrant et al. | |
| 2007/0147733 A1 | 6/2007 | Matsumura et al. | |
| 2008/0050072 A1 | 2/2008 | Durrant et al. | |
| 2008/0095501 A1 | 4/2008 | McColloch | |
| 2008/0166094 A1 | 7/2008 | Bookbinder et al. | |
| 2008/0279509 A1 | 11/2008 | Durrant et al. | |
| 2009/0041412 A1 | 2/2009 | Danley et al. | |
| 2009/0169163 A1 | 7/2009 | Abbott, III et al. | |
| 2009/0213894 A1 | 8/2009 | Grapov et al. | |
| 2009/0324175 A1 | 12/2009 | Everett et al. | |
| 2009/0324176 A1 | 12/2009 | Cheng et al. | |
| 2010/0027943 A1 | 2/2010 | Armani et al. | |
| 2010/0028563 A1 | 2/2010 | Ota | |
| 2010/0104244 A1 | 4/2010 | Grinderslev | |
| 2010/0135618 A1 | 6/2010 | Howard et al. | |
| 2010/0163754 A1 | 7/2010 | Van Herpen | |
| 2010/0178007 A1 | 7/2010 | Thomson et al. | |
| 2010/0215325 A1 | 8/2010 | Tamura et al. | |
| 2011/0097039 A1 | 4/2011 | Zhao et al. | |
| 2011/0103752 A1 | 5/2011 | Little | |
| 2011/0229083 A1* | 9/2011 | Dainese J nior | G02B 6/3869 385/74 |
| 2011/0229090 A1 | 9/2011 | Isenhour et al. | |
| 2011/0255825 A1 | 10/2011 | Ko et al. | |
| 2011/0299816 A1 | 12/2011 | Yen et al. | |
| 2012/0027346 A1 | 2/2012 | Castagna et al. | |
| 2012/0099822 A1 | 4/2012 | Kuffel et al. | |
| 2012/0099823 A1* | 4/2012 | Wu | G02B 6/3817 385/88 |
| 2012/0114287 A1 | 5/2012 | Lin | |
| 2012/0155803 A1* | 6/2012 | Benjamin | G02B 6/3886 385/33 |
| 2013/0136400 A1 | 5/2013 | Isenhour et al. | |
| 2013/0322824 A1 | 12/2013 | Isenhour et al. | |
| 2014/0029899 A1 | 1/2014 | Isenhour et al. | |
| 2014/0143996 A1 | 5/2014 | Bhagavatula et al. | |
| 2014/0185991 A1 | 7/2014 | de Jong et al. | |
| 2014/0334779 A1* | 11/2014 | Megason | G02B 6/3825 385/62 |
| 2016/0202430 A1 | 7/2016 | De Jong et al. | |

FOREIGN PATENT DOCUMENTS

| | | |
|---|---|---|
| CN | 102122035 A | 7/2011 |
| CN | 102147508 A | 8/2011 |
| DE | 19932907 A1 | 2/2001 |
| DE | 10108783 | 9/2002 |
| DE | 18188783 A1 | 9/2002 |
| EP | 1091223 A2 | 4/2001 |
| EP | 1182478 A1 | 2/2002 |
| FR | 2545617 A1 | 11/1984 |
| GB | 2154333 A | 9/1985 |
| GB | 2344469 A | 6/2000 |
| JP | 57076509 A | 5/1982 |
| JP | 63-174004 | 7/1988 |
| JP | 63-293510 | 11/1988 |
| JP | 2001004863 A | 1/2001 |
| JP | 2004219478 A | 8/2004 |
| JP | 2007041222 A | 2/2007 |
| JP | 2007163969 A | 6/2007 |
| JP | 2011116955 A | 6/2011 |
| WO | WO 97/34176 | 9/1997 |
| WO | WO 00/70381 | 11/2000 |
| WO | WO 01/11409 A2 | 2/2001 |
| WO | WO 02/056076 A2 | 7/2002 |
| WO | WO 02/057826 A1 | 7/2002 |
| WO | WO 03/076993 A2 | 9/2003 |

(56) References Cited

FOREIGN PATENT DOCUMENTS

| WO | WO 2011/116167 A1 | 9/2011 |
|----|-------------------|--------|
| WO | WO 2012/015734 A1 | 2/2012 |
| WO | WO 2012/120914 A1 | 9/2012 |

OTHER PUBLICATIONS

Zickar et al. "MEMS compatible micro-GRIN lenses for fiber to chip coupling of light" Optics Express vol. 14 No. 10 (2006) p. 4237-4249.
EP Rule 161B Communication issued in corresponding Application No. 14736248.7, dated Feb. 19, 2016.
CN Official Action issued in corresponding Application No. 2014800367860, dated Aug. 22, 2016.
Patent Cooperation Treaty, International Search Report for PCT//US14/042665, dated Jul. 3, 2014, 7 pages.
Patent Cooperation Treaty International Search Report, Application No. PCT/US2012/054059, dated May 3, 2013, 8 pages.
Patent Cooperation Treaty International Search Report, Application No. PCT/US2013/043041, dated Apr. 8, 2014, 5 pages.
Chinese Search Report, Application No. 201280043490.2, dated Feb. 16, 2015, 2 pages.
Chinese Office Action, Application No. 201280043490.2, dated Mar. 2, 2015, 5 pages.
European Office Action, Application No. 12774325.9, dated Apr. 24, 2014, 23 pages.
Patent Cooperation Treaty Form ISA/210, International Application No. PCT/US2013/051456, dated Sep. 2, 2013, 5 pages.
Patent Cooperation Treaty Form ISA/237, International Application No. PCT/US2013/051456 dated Sep. 2, 2013, 4 pages.
W. J. Tomlinson, "Applications of GRIN-rod lenses in optical fiber communications systems," Applied Optics, Apr. 1, 1980, vol. 19, No. 7, pp. 1127-1138.
Emkey, et al., "Analysis and Evaluation of Graded-Index Fiber-Lenses," Journal of Lightwave Technology, vol. LT-5, No. 9, Sep. 1987, pp. 1156-1164.
Palais, Joseph C, "Fiber coupling using graded-index rod lenses," Applied Optics, Jun. 15, 1980, vol. 19, No. 12, pp. 2011-2018.
http:\\www.cvimellesgroit.com, "Gradient-Index Lenses".
Chanclou, et al., "Design and demonstration of a multicore single-mode fiber coupled lens device," Optics Communications 233, 2004, pp. 333-339.
Senior, et al., "Misalignment losses at multimode graded-index fiber splices and GRIN rod lens couplers," Applied Optics, Apr. 1, 1985, vol. 24, No. 7, pp. 977-983.
Gilsdorf, et al., "Single-mode fiber coupling efficiency with graded-index rod lenses," Applied Optics, Jun. 1, 1994, vol. 33, No. 16, pp. 3440-3445.
Cusworth, et al., "Angular tilt misalignment loss at a GRIN rod lens coupler," Applied Optics, Jun. 1, 1986, vol. 25, No. 11, pp. 1775-1779.

\* cited by examiner

OPTICAL PLUG HAVING A TRANSLATING COVER AND A COMPLIMENTARY RECEPTACLE

PRIORITY APPLICATIONS

This application is a continuation of International Application No. PCT/US14/42665, filed on Jun. 17, 2014, which claims the benefit of priority to U.S. application Ser. No. 61/839,172, filed on Jun. 25, 2013, both applications being incorporated herein by reference.

FIELD

The disclosure is directed to optical connections for use in electronic devices. More specifically, the disclosure is directed to optical connectors such as optical plug connectors having a translating cover along with a complimentary receptacle.

BACKGROUND

As electronic devices move toward operation at faster data rates the electrical interfaces on these devices along with the electrical transmission cables will reach their bandwidth capacity limitations. Additionally, the electronic devices are trending to smaller and thinner footprints. Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime. Consequently, optical connections for consumer application will need to be easy to clean and maintain by the user.

There is an unresolved need for optical connections that may be used for relatively small devices like typical consumer applications such personnel devices such as smart phones, tablets and other consumer devices that have a relatively small footprint. The concepts disclosed herein solve this unresolved need for optical connections.

SUMMARY

The disclosure is directed to an optical plug connector including an optical portion having an optical interface and a cover for protecting the optical interface. The cover can translate toward the optical interface when connecting the optical plug connector and a portion of the cover allows transmission of optical signals therethrough.

The disclosure is also directed to an optical plug connector including an optical portion having an optical interface, one or more alignment pins, and a cover for protecting the optical interface. The cover includes one or more bores for receiving the one or more alignment pins, wherein the cover can translate on the one or more alignment pins toward the optical interface when connecting the optical plug connector and a portion of the cover allows transmission of optical signals therethrough.

The disclosure is further directed to an optical plug connector including an optical portion having a nose with an optical interface, a monolithic alignment pin, a first resilient member, a second resilient member, and a cover for protecting the optical interface. The cover includes a first bore and a second bore for respectively receiving the monolithic alignment pin and a cavity. The cover can translate on the monolithic alignment pin toward the optical interface when connecting the optical plug connector so that the nose engages the cavity of the cover when in a retracted position and the first and second resilient members bias the cover toward a forward position, and a portion of the cover allows transmission of optical signals therethrough.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
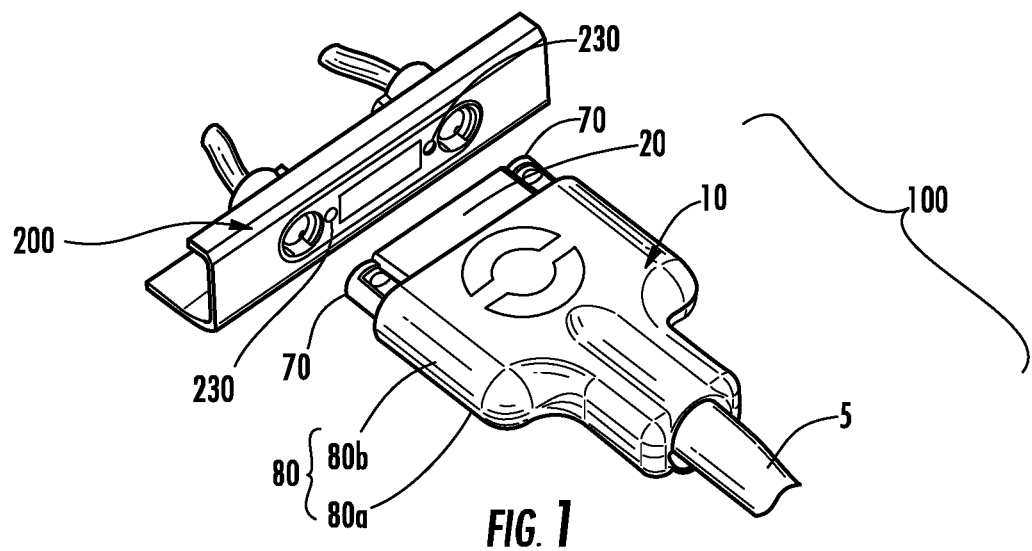
FIG. 1 is a perspective view of an optical plug connector as part of a cable assembly being aligned with a complimentary receptacle according to the concepts disclosed.

Reference will now be made in detail to the embodiments of the disclosure, examples of which are illustrated in the accompanying drawings. Whenever possible, like reference numbers will be used to refer to like components or parts.

The optical connections disclosed herein enable high-speed data applications for transmitting optical signals to electronic devices such as fast data rates such as 5 Gigabits/sec or greater along with having a relatively small and compact footprints so that they are useful for use with electronic devices such as consumer devices and the like. The concepts disclosed include an optical plug connector having a cover that can translate during mating and a complimentary optical receptacle that mates with the optical plug connector. The optical receptacle may be a portion of an electronic device such as a telephone, laptop, tablet, display, camera, desktop computer or the like so it can receive and transmit optical signals from the optical plug connector. The concepts disclosed may solely have optical connectivity or have hybrid connectivity with optical and electrical. Further, the concepts of the optical connections may be used in other applications such as optical backplanes, switches, routers and other equipment.

In order to transmit/receive optical signals, the optical plug connector or optical receptacle may include one or more optical channels for that may include one or more lenses or not as desired. By way of example, the one or more lenses of the optical plug connector are used for collimating or focusing the light from the transmission channel(s) of the plug and are optically coupled to a complementary lenses of the optical receptacle such as molded lenses that direct the optical signal to an active element such as a photodiode or the like. The receive channels of the optical plug connector obtains its signals from an active element such as a laser like a vertical-cavity surface-emitting laser (VCSEL) in communication with the molded lens of the optical receptacle for transmission of the optical signals of the optical plug connector when the optical plug connector and optical receptacle are mated together. The optical plug connector and optical receptacle according to the concepts disclosed provide quick and easy connectivity with a footprint that is advantageous for use with electronic devices having thin and compact profiles. Further, the concepts provide a simple optical plug assembly with a cover that protects the lenses or optical channels of the optical plug connector from dirt and debris and allows access for easy cleaning of the cover (e.g., accessible for wiping) and/or replacing of the cover if desired or necessary to due to damage. Moreover, the cover of the optical plug connector translates from a forward position to a retracted position, but unlike other connector designs the optical interface does not appreciably translate in the Z-direction and instead may "float" to a small degree for optical alignment. Thus, because the concepts disclosed do not require translation of the optical portion like conventional designs, the issues with optical alignment and/or optical fiber movement with the optical portion are inhibited. Additionally, the optical plug connector is a robust and reliable design for applications that are expected to experience large number of mating/unmating cycles such as consumer electronic applications.

Figure 2:
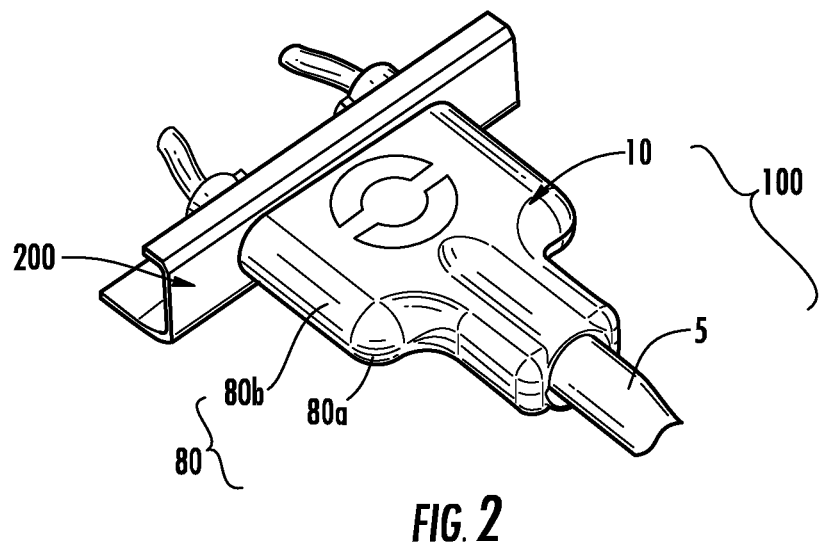
FIG. 2 is a perspective view of the optical plug connector and the complimentary receptacle of FIG. 1 shown mated together.

FIG. 1 is a perspective view of an optical plug connector 10 (hereinafter "plug") being a portion of a cable assembly 100 as it is being aligned with a complimentary receptacle 200 and FIG. 2 is a perspective view of plug 10 of cable assembly 100 mated with receptacle 200. Plug 10 is attached to cable 5, thereby forming cable assembly 100. Cable assembly 100 may use any suitable cable 5 attached to the plug. Although, the cable 5 and plug 10 are shown having a straight through alignment for simplicity sake, the concepts of the plug disclosed herein may have any suitable angle with respect to the cable such as 45, 60 or 90 degrees, but still other angles are possible.

Figure 7:
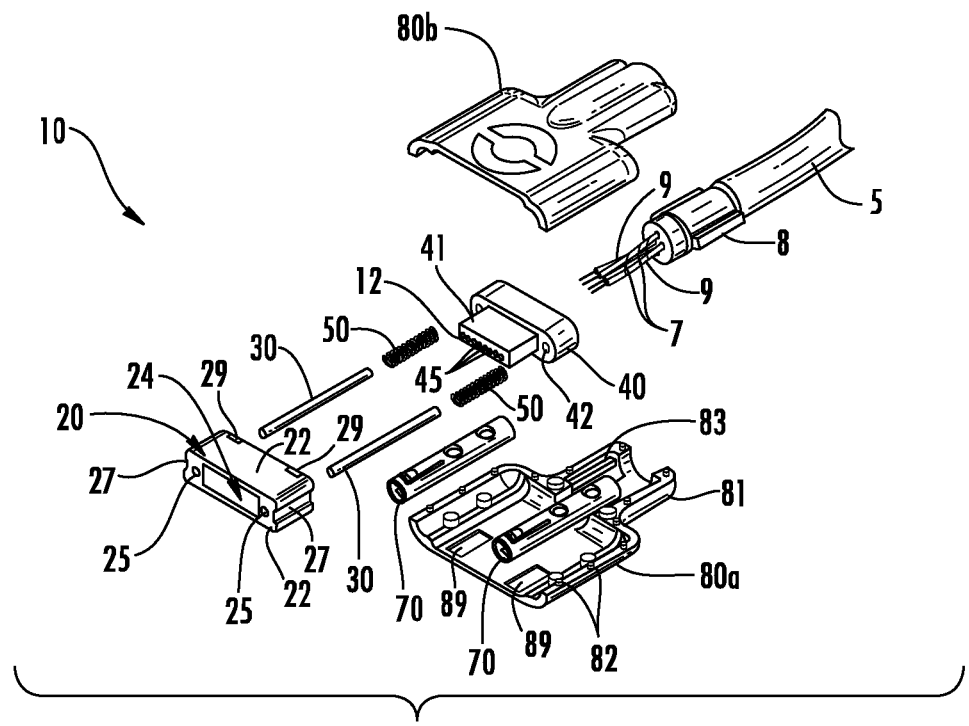
FIG. 7 is a front exploded view of the optical plug connector of FIGS. 1 and 2 along with a cable prepared for assembly with the optical plug connector.

Plugs according to the concepts disclosed may have an optical portion with an optical interface or both an optical portion with an optical interface and an electrical portion with an electrical interface. As shown in this explanatory embodiment, plug 10 and complimentary receptacle 200 both have an optical interface and an electrical interface. For instance, plug 10 optionally includes one or more electrical contacts 70 in addition to an optical portion 40 having an optical interface 12 (FIG. 7). Consequently, the plug 10 and complimentary receptacle 200 may transmit/receive signals and/or power as desired.

Figure 3:
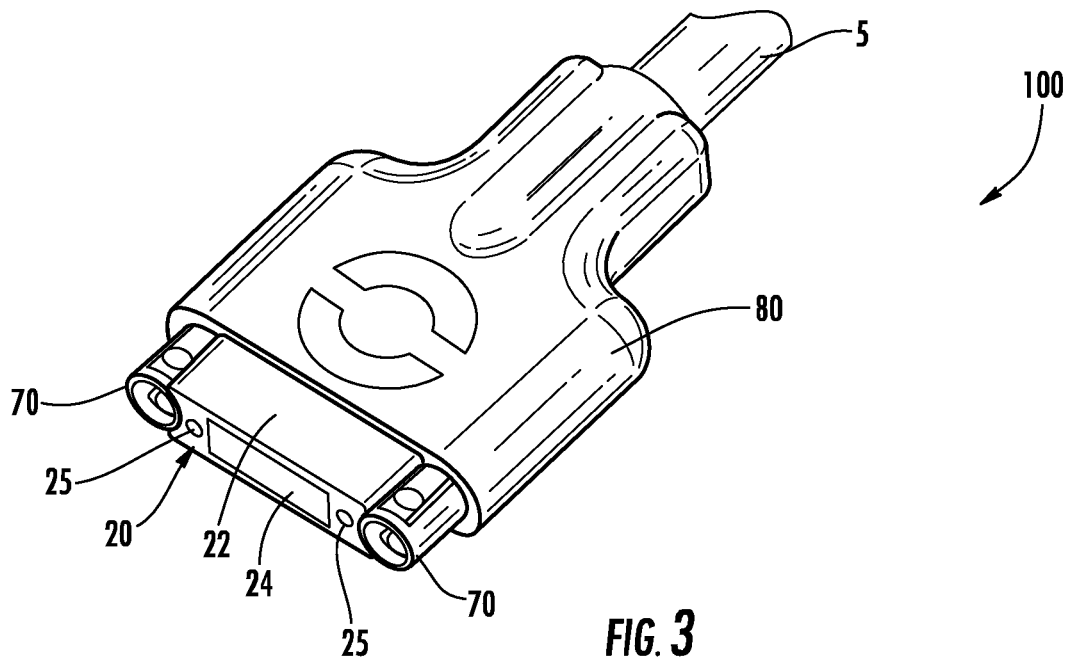
FIG. 3 is a front perspective view of the optical plug connector of FIGS. 1 and 2 shown with the cover in a forward position.
Figure 4:
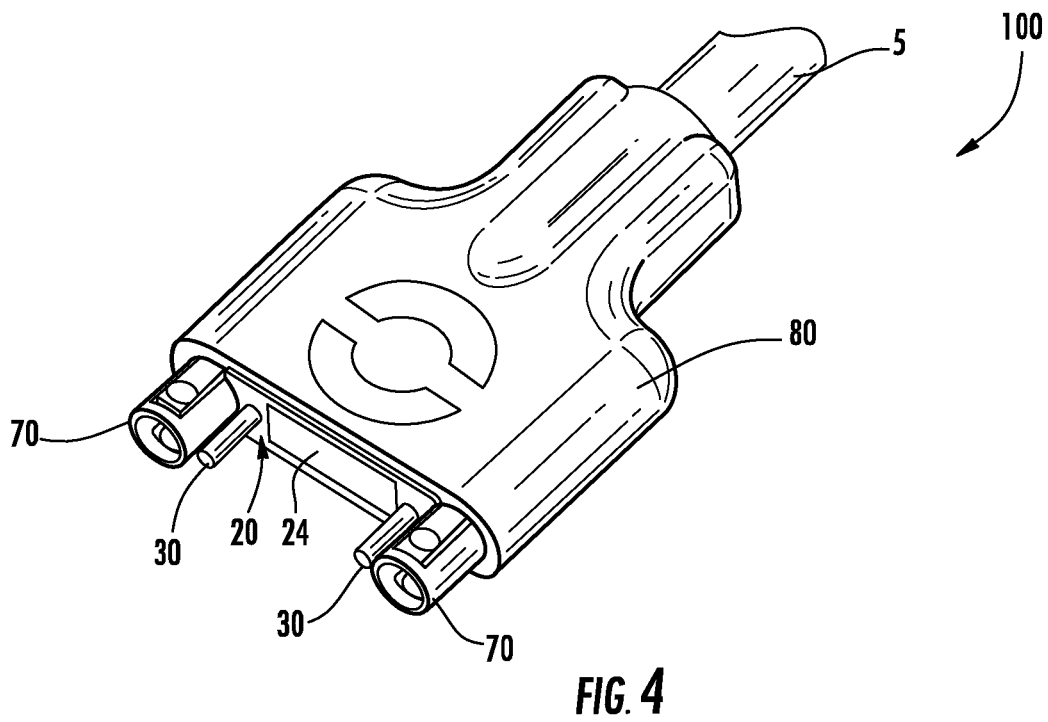
FIG. 4 is a front perspective view of the optical plug connector of FIGS. 1 and 2 shown with the cover in a retracted position such as occurs when the optical plug connector is mated with the receptacle.

FIGS. 3 and 4 are front perspective views of plug 10 shown respectively with a cover 20 in a forward position and the cover 20 in a retracted position such as occurs when the optical plug connector is mated with the receptacle 200 such as shown in FIG. 2. In other words, cover 20 can translate toward the optical interface 12 (FIG. 7) when connecting the plug 10 connector and a portion of cover 20 allows transmission of optical signals therethrough. The cover 20 can may have a manual operation for retraction/extension with a user activated slide or it may be biased to an extended position as desired. Moreover, the optical portion 40 does not translate like cover 20, but instead the optical portion may "float" for optical alignment with the complimentary receptacle. As used herein, "float" means relatively small movements or shifting for the optical alignment of optical portions of the plug. Consequently, the plug designs disclosed are advantageous over conventional designs where the optical portion translates since the optical fibers are not disturbed by significant movements and/or the optical interface is protected and not exposed to potential damage, dirt, debris and the like.

Cover 20 protects the optical interface 12 from dirt, debris and contact, etc. when in both the extended position (FIG. 3) and retracted position (FIG. 4). By way of example, cover 20 may include a body 22 and a window 24 attached to the body 22 where the window 24 allows the transmission of optical signals therethrough. Further, cover 20 may be inspected or cleaned by the user as desired. Cover 20 may even be removed and replaced if desired. Cover 20 translates from the extended position to the retracted position using one or more cover guides. Cover guides may be any suitable structure disposed on any suitable component such as grooves, protrusions or rails disposed on a housing 80 and/or cover 20, recesses or bores located on cover 20, alignment pins, etc. as desired. In some plug embodiments many cover guides may exist for guiding the translation of the cover 20 as desired. By way of example, cover 20 of plug 10 has several different cover guides. First, plug 10 includes cover guides configured as one or more alignment pins 30 that cooperate with cover 20 that includes one or more bores 25 for receiving the alignment pins 30 as best shown in FIG. 4. Although, alignment pins 30 are also used for alignment of the optical interface 12, bores 25 of cover 20 need not have a precision fit with the alignment pins 30 since the translation of cover 20 does not impact optical alignment of the plug 10. As shown in FIG. 4, when cover 20 is in the retracted position the one or more alignment pins 30 extend forward of the cover 20 and may be used for aligning the optical interface 12 of plug 10 with receptacle 200 by cooperating with one or more bores 230.

Figure 8:
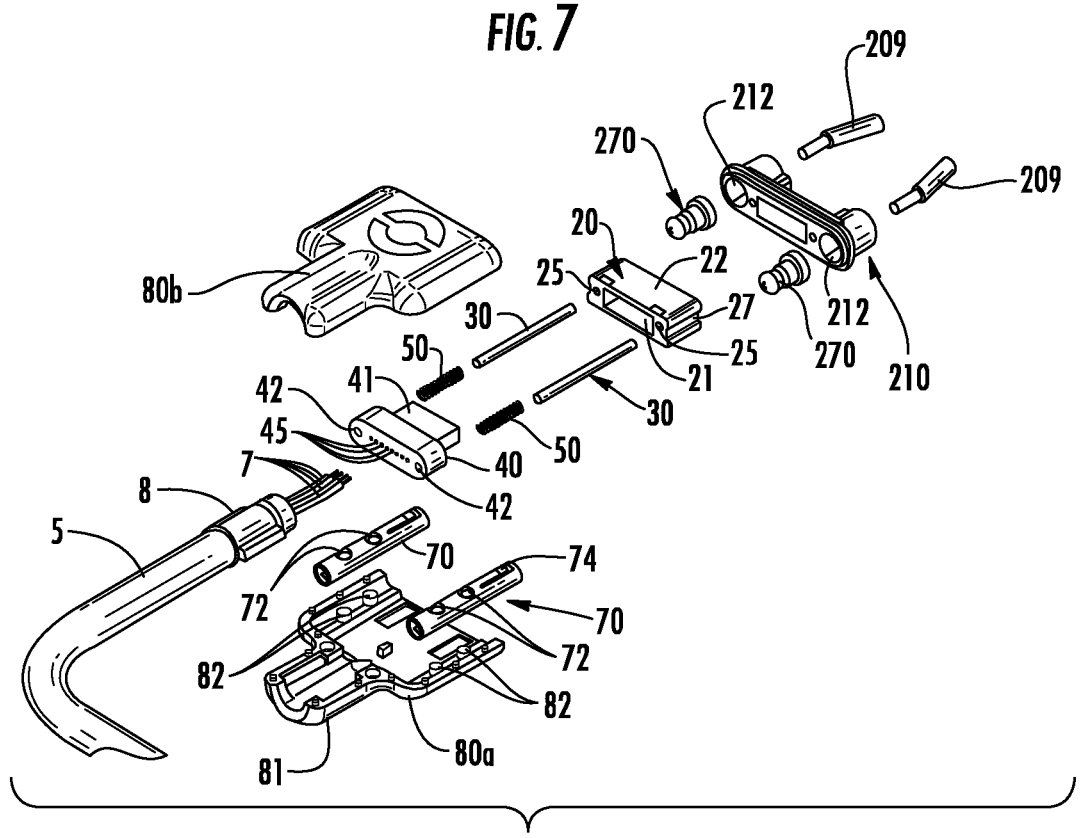
FIG. 8 is a rear exploded view of the optical plug connector of FIG. 7 along with a portion of the complimentary receptacle.

Plug 10 also includes a second cover guide structure formed on the cover 20. Specifically, cover 20 has one or more recesses 27 that are cover guides. Recesses 27 generally conform with a portion of the one or more electrical contacts 70. More specifically, recesses 27 are concave recesses disposed on opposite ends of cover 20 and generally conform to the round shape of electrical contacts 70 so that the cover moves uniform distances on both ends when translating. Finally, plug 10 has third cover guides with the cover 20 cooperating with the housing 80. Specifically, cover 20 has one or more protrusions 29 that are cover guides. Protrusions 29 are disposed on the top and bottom portions of cover 20 and cooperate with one or more grooves 89 disposed on the inside of housing 80 as shown in FIGS. 7 and 8. Moreover, protrusions 29 act as stops so that the cover 20 remains secured within the housing 80 when in the extended position since the grooves 89 do not extend to the front end of housing 80; however, cover 20 may be removed. To remove the cover 20, the user simply squeezes the rear portion of cover 20 to deflect the protrusions inward and then the cover 20 may be removed. Consequently, the user may have access to inspect, wipe and/or clean the optical interface 12 behind the cover 20 of the plug 10 as desired, or for replacing the cover 20 if it is damaged.

Cover 20 may have any suitable configuration for the given plug design. For instance, the window 24 may be formed from any suitable material such as a polymer such as Ultem® or Zeonex® or a glass such as a chemically strengthened glass such as available from Corning, Incorporated of Corning, N.Y. As an example, the window 24 may be Gorilla® Glass available from Corning Incorporated. Moreover, the window 24 may have a suitable coating such as an anti-reflection coating and/or a scratch-resistant coating as desired. In other embodiments, the cover 20 is formed as a single component. By way of example, the cover 20 may be formed entirely from a polymer that is transmissive to the optical signals. Plug 10 is suitable for applications that anticipate a relatively large number of mating/unmating cycles or environments that may be exposed to dirt and debris such as consumer devices; however, suitable materials for components should be selected to withstand the desired number of mating cycles.

Figure 5:
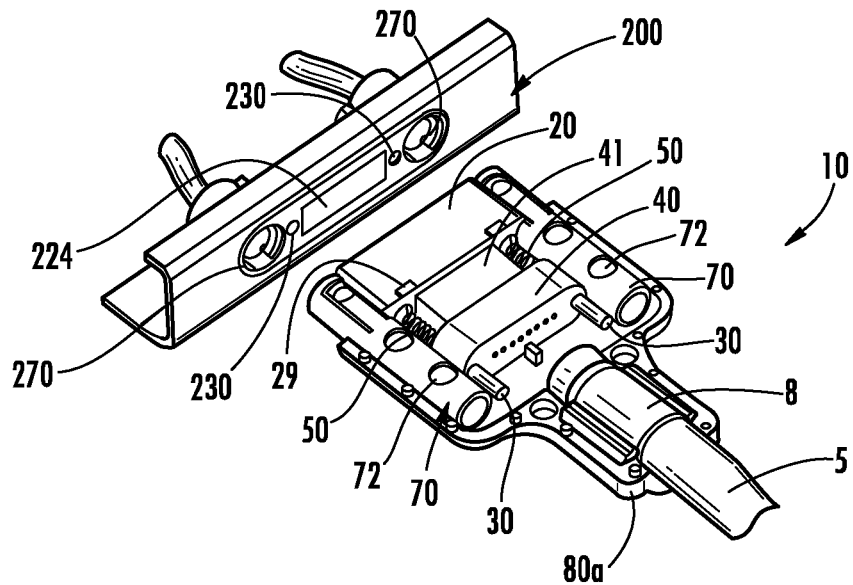
FIGS. 5 and 6 respectively depict the optical plug connector and complimentary receptacle of FIGS. 1 and 2 aligned for mating and in contact before mating with a portion of the housing removed from the plug in both FIGS. 5 and 6 for showing internal details.
Figure 6:
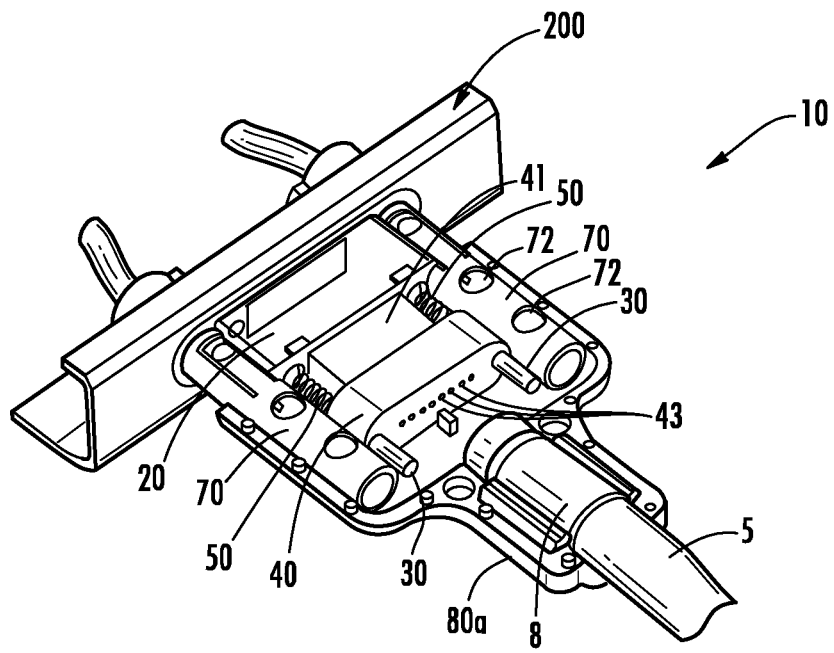

FIGS. 5 and 6 respectively depict the plug 10 (with a portion 80b of the housing 80 removed) and receptacle 200 aligned for mating and in contact before mating together. When assembled, the components of plug 10 are at least partially disposed in housing 80 that has a first portion 80a and a second portion 80b. As depicted, plug 10 may also include one or more resilient members 50 for biasing cover 20 to an extended position (e.g., forward position). Resilient member 50 may have any suitable construction such as leaf springs or the like. In embodiment resilient members 50 are coil springs. The coil springs are located between the optical portion 40 and cover 20 and disposed on respective alignment pins 30 as shown. Consequently, cover 20 may move to the retracted position guided in part by alignment pins 30 and biased forward by resilient members 50. As shown, optical portion 40 has alignment pins 30 attached using one or more bores 42 (FIGS. 7 and 8) and is disposed between electrical contacts 70 with a nose 41 of optical portion 40 aligned with a cavity 21 (FIG. 8) at a rear of cover 20. When cover 20 moves rearward the nose 41 engages cavity 21 of cover 20 when in a retracted position. Thus, when the cover 20 is in the retracted position the window 24 of cover 20 is in close proximity to the optical interface 12 of the optical portion 40 for allowing the transmission of optical signals through the window 24 and to/from optical interface 12. One or more electrical contacts 70 are secured between the first portion 80a and second portion 80b of housing 80. Specifically, electrical contacts 70 include one or more openings 72 that receive one or more protrusions 82 of first and second portions 80a,80b of housing 80 and secure the electrical contacts 70 in position. When assembled, a portion of electrical contacts 70 extend beyond housing 80 for making electrical connections with one or more electrical contacts 270 of receptacle 200 when mated together. Electrical contacts 70 also include one or more detents 74 for engagement with the electrical contacts of receptacle 200. First and second portion 80a,80b of housing 80 are aligned and secured together using attachment features 82 such as pins and bores that align; moreover, the first and second portions 80a,80b may be the same part that assembles to itself. Although electrical contacts are depicted as being round any suitable size, shape or style of electrical contact may be used with the concepts disclosed such as pins, pogo pins, tubes, blades, rails or other suitable electrical contacts.

FIGS. 7 and 8 are respective front and rear partially exploded views of the plug 10 along with cable 5 prepared for assembly with plug 10. Plugs and receptacles may have any suitable number of optical channels arranged in any desired pattern such as a linear or round array of optical channels. In this plug embodiment, optical interface 12 has a plurality of optical channels are arranged in a linear array. Optical interface 12 includes a plurality of lens 45 integrally formed in the optical portion 40 and is formed from an optically transmissive material for desired wavelengths. Other embodiments may have the lenses formed as a separate component(s) if desired, but using a single component with integral lenses aids in controlling registration of the lenses with the bores 42 that cooperate with alignment pins 30. Additionally, an index-matching material may be used between the ends of the respective optical fibers and the face of optical portion 40 on the side where the optical fiber is inserted into the optical portion 40 for reducing optical reflection, scattering and loss by eliminating any air gaps between the fiber end and the optical portion 40.

Cable 5 of this embodiment includes both optical fibers 7 and electrical conductors 9 as shown. The optical fibers 7 are cleaved to a proper length and inserted into respective fiber bores 43 on the rear portion of optical body 40 for optical communication with the lenses. An index-matching material may be used on the ends of the optical fibers 7 for improving optical coupling with the optical portion 40. Electrical conductors 9 are electrically connected with the electrical contacts 270 in a suitable manner. A crimp band 8 is attached near and end of cable 5 for creating a demarcation point for the optical fibers 7 and electrical conductors 9 and is used for securing the cable 5 to housing 80. When deformed about cable 5, crimp band 8 has one or more wings that fit into a saddle 83 of housing 80 for attaching the cable 5 to plug 10 and inhibiting relative movement therebetween and along with strain-relieving the cable 5 to the plug 10. If desired, a filling material such as an adhesive, silicone, a sleeve, an insert or the like may be injected or placed into the passageway of the cable for protecting the optical fibers.

Thereafter, the first and second shells 80a,80b of housing 80 can be assembled about the components.

Receptacle 200 may also optionally include one or more electrical contacts 270 for transmitting electrical signals or power as desired that fit into a receptacle body 210. Electrical contacts 270 fit into a plurality of respective openings 212 of receptable body 210 and are electrically connected to electrical conductors 209 of the electronic device such as a tablet, smart phone, display or the like.

Other components of the receptacle 200 and the signal conversion components for the electronic device will be discussed.

Receptacle 200 may include a receptacle circuit board attached to the receptacle body 210 that electrically connects to a complimentary circuit board of the electronic device. The receptacle circuit board includes an electrical interface and one or more integrated circuits for processing signals along with other components as desired for communicating with the electronic device. Receptacle 200 may include a receptacle circuit board assembly attached to the lens body of the receptacle 200. When the electronic device is assembled, the receptacle circuit board assembly is electrically attached to circuit board of the electronic device for communicating signals between the receptacle and the circuit board of the electronic device. For instance, receptacle 200 is configured with a flexible tether having pluggable electrical attachment to circuit board of the electronic device. Specifically, circuit board of the electronic device includes an electrical connector for cooperating with a complementary electrical connector of the receptacle circuit board assembly for easily making the appropriate electrical connections between the circuit board of the electronic device and the receptacle circuit board assembly. Of course, other electrical connectivity may be used with the concepts disclosed.

The receptacle circuit board assembly is used for converting the optical signals to electrical signals and vice versa and may have any suitable arrangement or layout. The receptacle circuit board assembly includes at least one active component aligned with at least one optical channel of the optical body of the receptacle when properly aligned and attached to lens body of the receptacle. The receptacle circuit board assembly is attached to the lens body and spaced at a suitable distance from the lenses using ledges or other structure, which provides the desired z-direction distance between the active component and the lens body. The receptacle circuit board assembly may use a passive and/or active alignment for positioning the receptacle circuit board assembly in the X-direction and Y-direction. Active component(s) are an electro-optical component used for transmitting or receiving optical signals to/from the optical channels of the lens body of the receptacle 200. By way of example, the active component is a photodiode or other similar device for receiving optical signals or a vertical-cavity surface-emitting laser (VCSEL) for transmitting optical signals, thereby providing one or more transmit and receive channels. Additionally, the receptacle circuit board assembly may include further electronic components such as transimpedance amplifiers (TIAs) or laser drivers arranged as a first circuit portion and/or a second circuit portion for processing signals and other electronics such as integrated circuits (ICs) like clock and data recovery (CDR), laser drivers serializer/deserializer (SerDes), and the like on the circuit board.

The optical channels of the receptacle 200 include respective lenses at the rear side of the optical body for focusing or collimating the optical signals to/from the active components on the receptacle circuit board. "Operably attached" means that the active components of the receptacle circuit board assembly are properly spaced from the optical channels of the lens body (z-direction) such as the lenses of the optical body maintain the desired distance between the active components and the optical channels and suitable aligned in the x-direction and y-direction for providing the desired level of optical coupling.

The flexible substrate for electrical connection allows an electrical turn so that the profile of the device may remain small such as thin when electrically connecting the receptacle circuit board assembly having the active components (e.g., photodiodes and VCSELs), transimpedence amplifier (TIA), and the laser drivers to the other integrated circuits on the circuit board of the electronic device. Splitting the electronics between the receptacle circuit board assembly that is attached to the lens body 210 and other components on the circuit board of the electronic device such as the clock and data recovery (CDR) IC and SerDes IC allow for smaller receptacle footprints and keeps the specific electrical traces to/from the active components such as the TIA or laser drive to short lengths such as 200 microns or less and the electrical traces may even be about 100 microns or less. Specifically, the flexible substrate provides an electrical turn with flex coupling between the receptacle circuit board assembly and circuit board of the electronic device, thereby allowing relatively small form-factors for the optical connector since the CDR and SerDes IC's are relatively large and are located on another circuit portion such as the electronic device circuit board that can be orientated in different manner such as a horizontal plane where there is more space available.

Receptacle circuit board assembly may also include other advantageous arrangements when having optical connectors with more than one transmit and one receive channel. For instance, the receptacle circuit board assembly may use separate TIAs and/or laser drivers on the receptacle circuit board assembly (i.e., several TIAs or laser drivers for different optical channels). Consequently, a first circuit portion with the TIAs and laser drivers can now be split (i.e., multiple TIAs and laser drivers) with a dedicated TIA and laser driver placed onto each side of the plurality of optical channels that are arranged in an array. If using a receptacle circuit board assembly with multiple TIA/laser driver arrangement (e.g., one TIA/laser driver for each side of the array) for enabling a relatively small height H for the receptacle 200, thereby allowing use of the optical connector in thin devices such as smart phones, tablets and the like. Further, placing electrical components such as the TIA and laser drivers relatively close to the active components such as photodiodes and VCSELs allows relatively short wire bond lengths such as 100 microns or shorter for supporting high-speed data transfer rates such as 10 Gb/sec or more and even up to 20 Gb/sec and higher.

When assembled, the lens body attaches to receptacle body 210. The lens body may have an optional cover attached thereto for protecting the optical interface. In other words, the cover may protect the lenses that form the optical channels of the receptacle 200. The cover of receptacle 200 may be formed from any suitable material such as glass or a polymer as discussed herein.

Figure 9:
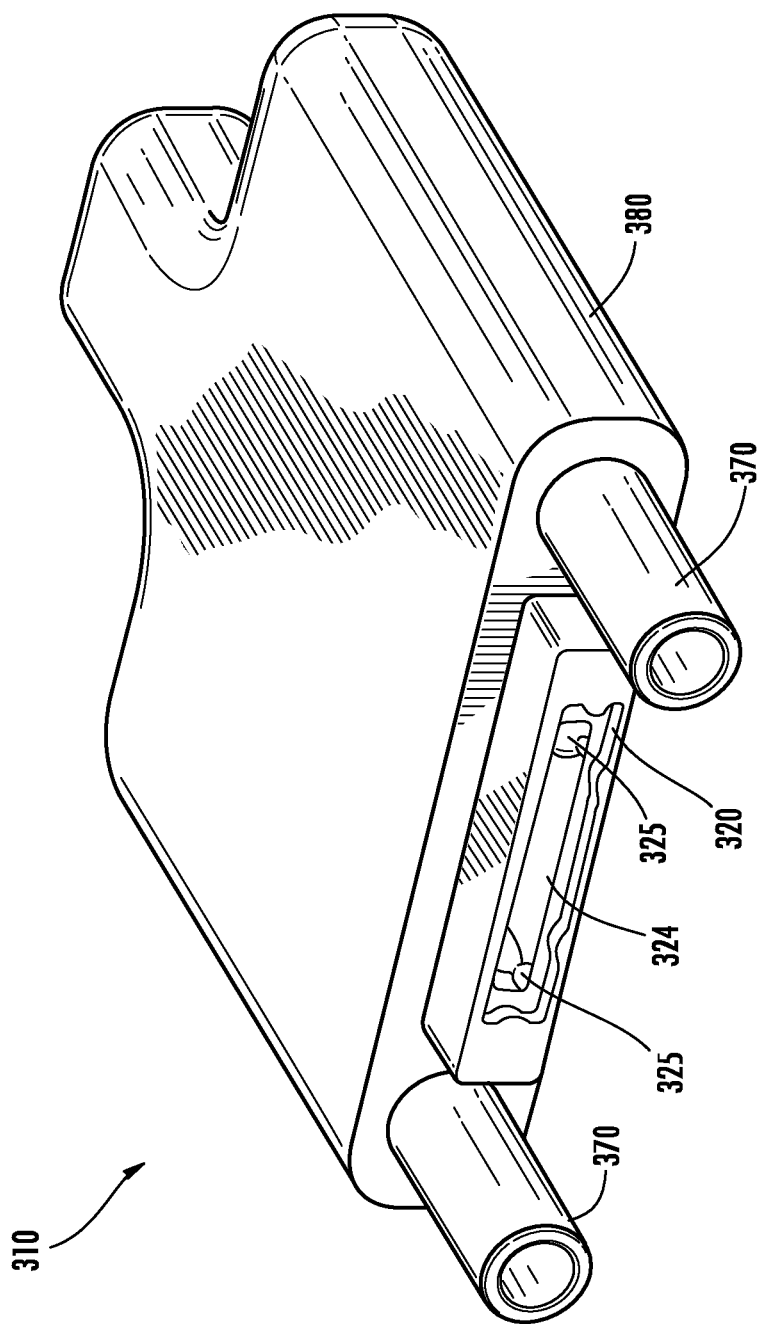
FIG. 9 is a front perspective view of another optical plug connector shown with the cover in a forward position.
Figure 10:
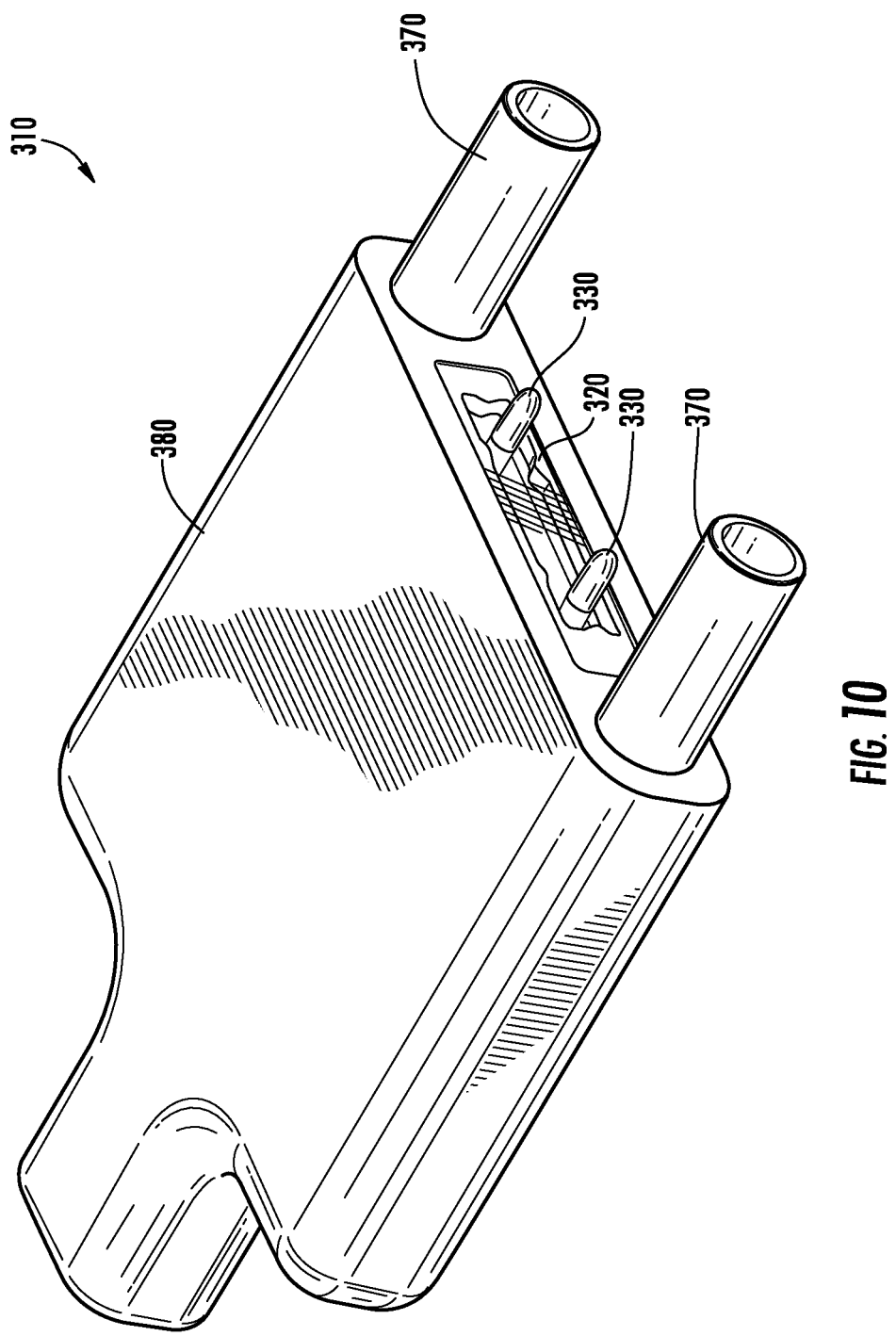
FIG. 10 is a front perspective view of the optical plug connector of FIG. 9 shown with the cover in a retracted position such as occurs when the optical plug connector is mated with a complimentary receptacle.

Other variations of plugs and receptacles are possible according to the concepts disclosed herein. By way of example, FIGS. 9-14 show another explanatory plug embodiment having a cover for protecting the optical interface where the cover can translate toward the optical interface when connecting the optical plug connector and a portion of the cover allows transmission of optical signals therethrough. FIG. 9 is a front perspective view of another optical plug connector 310 (hereinafter plug 310) shown with a cover 320 in a forward position and FIG. 10 shows plug 310 shown with the cover 320 in a retracted position such as occurs when the optical plug connector is mated with a complimentary receptacle. Plug 310 is similar to plug 10 and differences will be highlighted as appropriate. Like plug 10, plug 310 has a cover 320 that translates between a forward position and a retracted position using one or more cover guides. In this embodiment, one of the cover guides is a monolithic alignment pin 330 (FIGS. 11 and 12) and the cover 320 has bores 325 (e.g., disposed on the window 324) for receiving the monolithic alignment pin 330. However, the biasing of the cover 320 to a forward position is independent of the monolithic alignment pin 330 (e.g., no springs riding on the monolithic alignment pin) that also is used for optical alignment of the optical interface 12. Additionally, the length of the monolithic alignment pin may also be longer for optical alignment for this embodiment. Consequently, all things being equal optical alignment of the optical interface 12 should be more precise since there will not be any biasing forces that interacting with the monolithic alignment pin 330. Plug 310 also includes one or more optional electrical contacts 370. Electrical contacts 370 extend beyond a housing 380 and are fixed in position by being secured between a first portion 380a and a second portion 380b of housing 380. Specifically, first portion 380a and second portion 380b of housing 380 include one or more recesses 382 sized and shaped for receiving electrical contacts 370 and electrical contacts 370 are electrically attached to electrical conductors of the cable.

Figure 11:
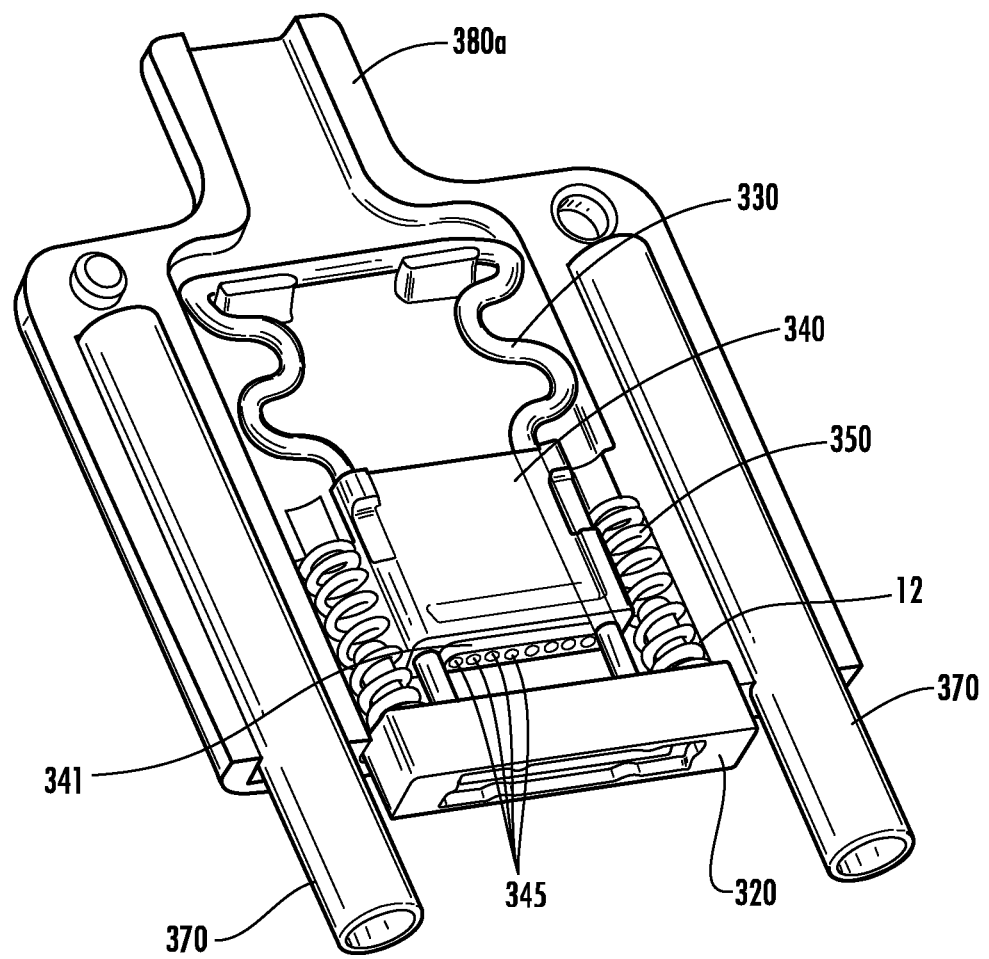
FIG. 11 is a top perspective view of the optical plug connector of FIGS. 9 and 10 shown with the cover in a forward position and a portion of the housing removed.
Figure 12:
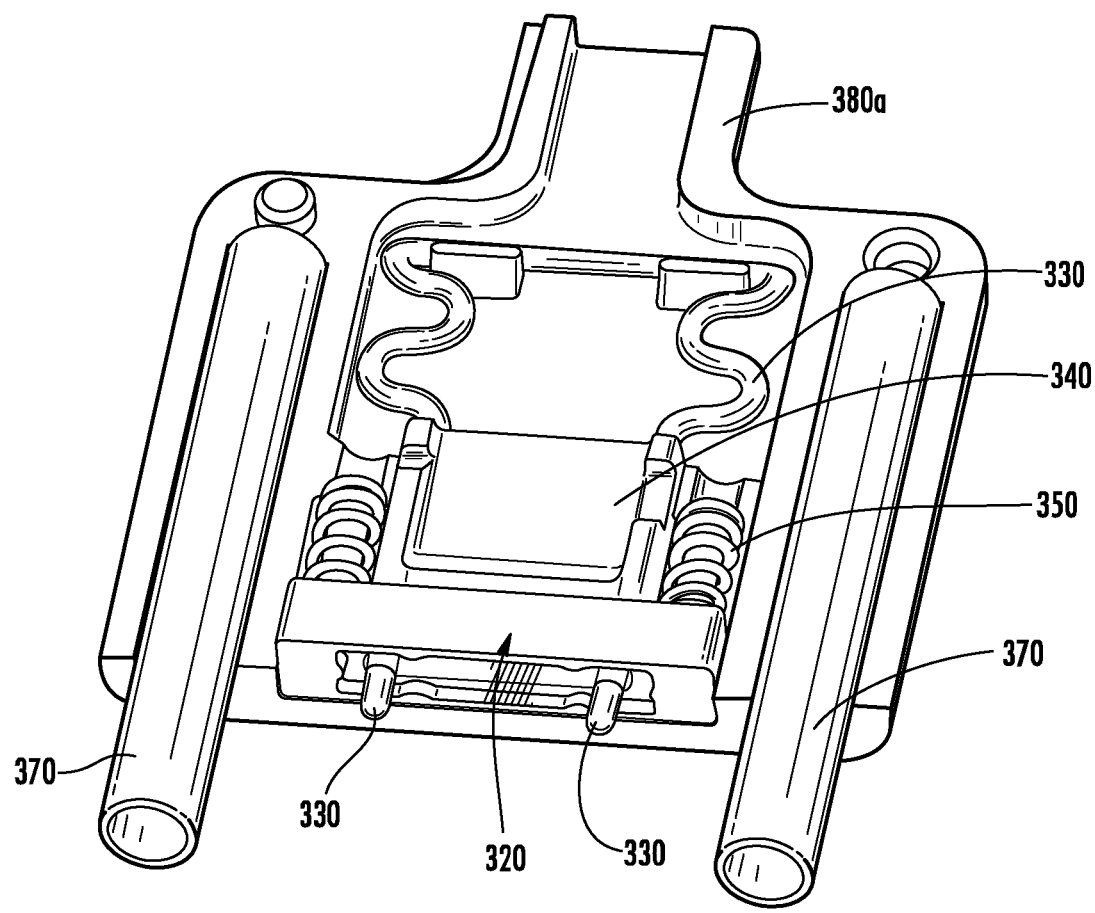
FIG. 12 is a top cutaway perspective view of the optical plug connector of FIGS. 9 and 10 shown with the cover in a retracted position and a portion of the housing removed.

FIG. 11 is a top perspective view of plug 310 shown with the cover 320 in a forward position and FIG. 12 is a top perspective view of plug 310 shown with the cover in a retracted position with both views having second portion 380b of housing 380 removed. As depicted, the monolithic alignment pin 330 has a generally serpentine form and is provided to enable some small float or deflection for the optical portion 340 having the optical interface 12. Monolithic alignment pin 330 is secured in housing 380 using one or more tabs and/or cutouts to inhibit movement. Optical portion includes a nose 341 that engages a cavity of cover 320 when in a retracted position; however, other embodiments may eliminate the nose and have a flat front end for the optical portion if desired. As depicted, plug 320 includes one or more resilient members 350 for biasing the cover 320 to a forward position. Resilient members 350 are coil springs that are seated on protrusions 327 of a body 322 of cover 320. Moreover, when approaching the fully retracted position protrusions 327 of cover 320 are at least partially received in guides 389 formed in the first and second portions 380a,380b of housing 380. Guides 389 also act as backstops for the resilient members 350 when the plug 320 is assembled.

Optical portion 340 includes optical interface 12 having a plurality of lenses 345 integrally formed in the optical portion 340 and is formed from an optically transmissive material for desired wavelengths. Other embodiments may have the lenses formed as a separate component(s) if desired, but using a single component with integral lenses aids in controlling registration of the lenses 345 with the bores 342 that cooperate with monolithic alignment pin 330. Optical portion 340 includes fiber bores (not visible) at the rear end that extend toward the lenses 345 for insertion of the respective optical fibers of the cable and are in optical alignment with the lenses 345 for optical communication therebetween. As discussed, an index-matching material may be used between the ends of the respective optical fibers and the face of optical portion 40 on the side where the optical fiber is inserted into the optical portion 40 for reducing optical reflection, scattering and loss by eliminating any air gaps between the fiber end and the optical portion 40.

Figure 13:
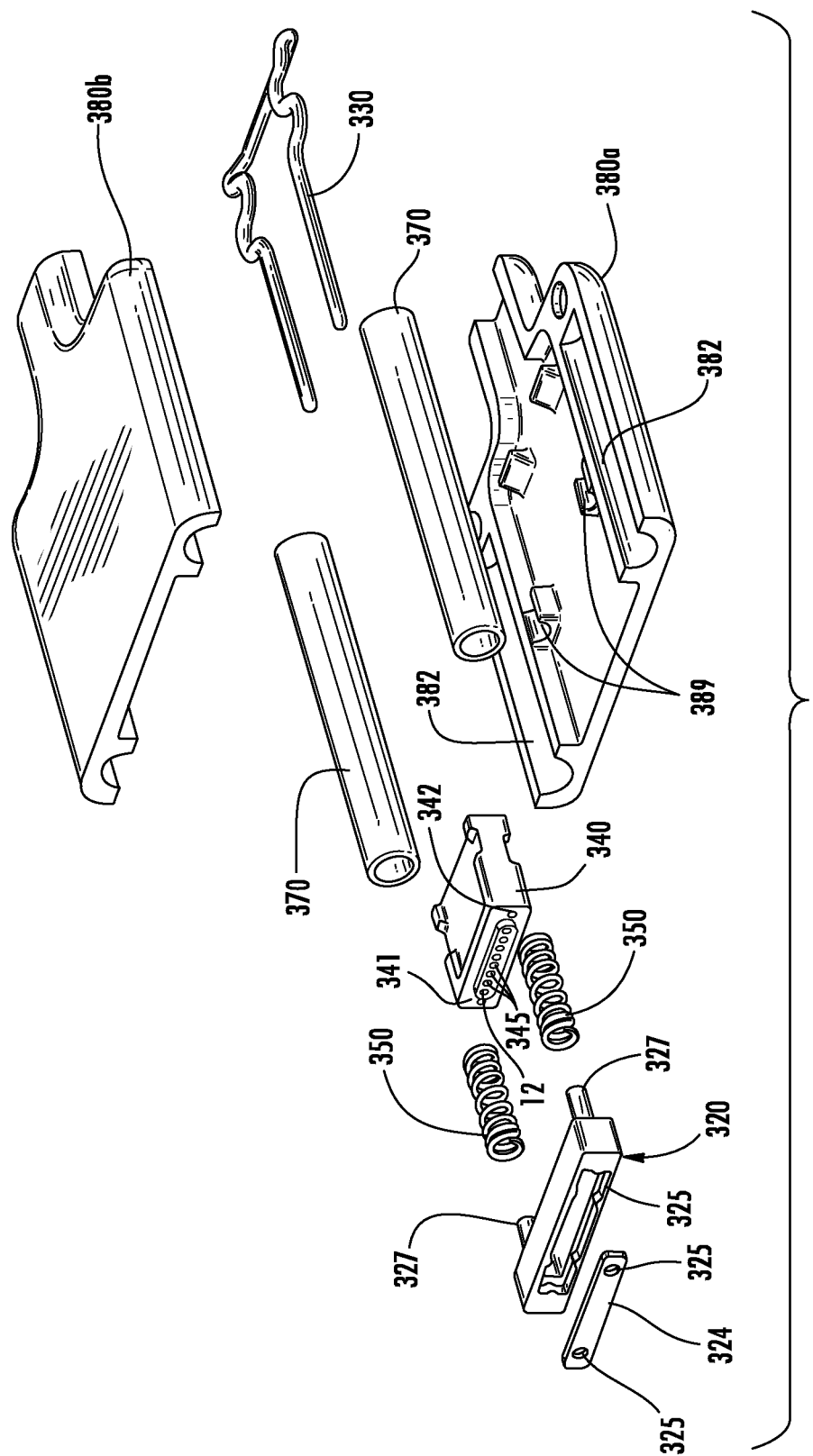
FIGS. 13 and 14 are exploded perspective views of the optical plug connector of FIGS. 9 and 10.
Figure 14:
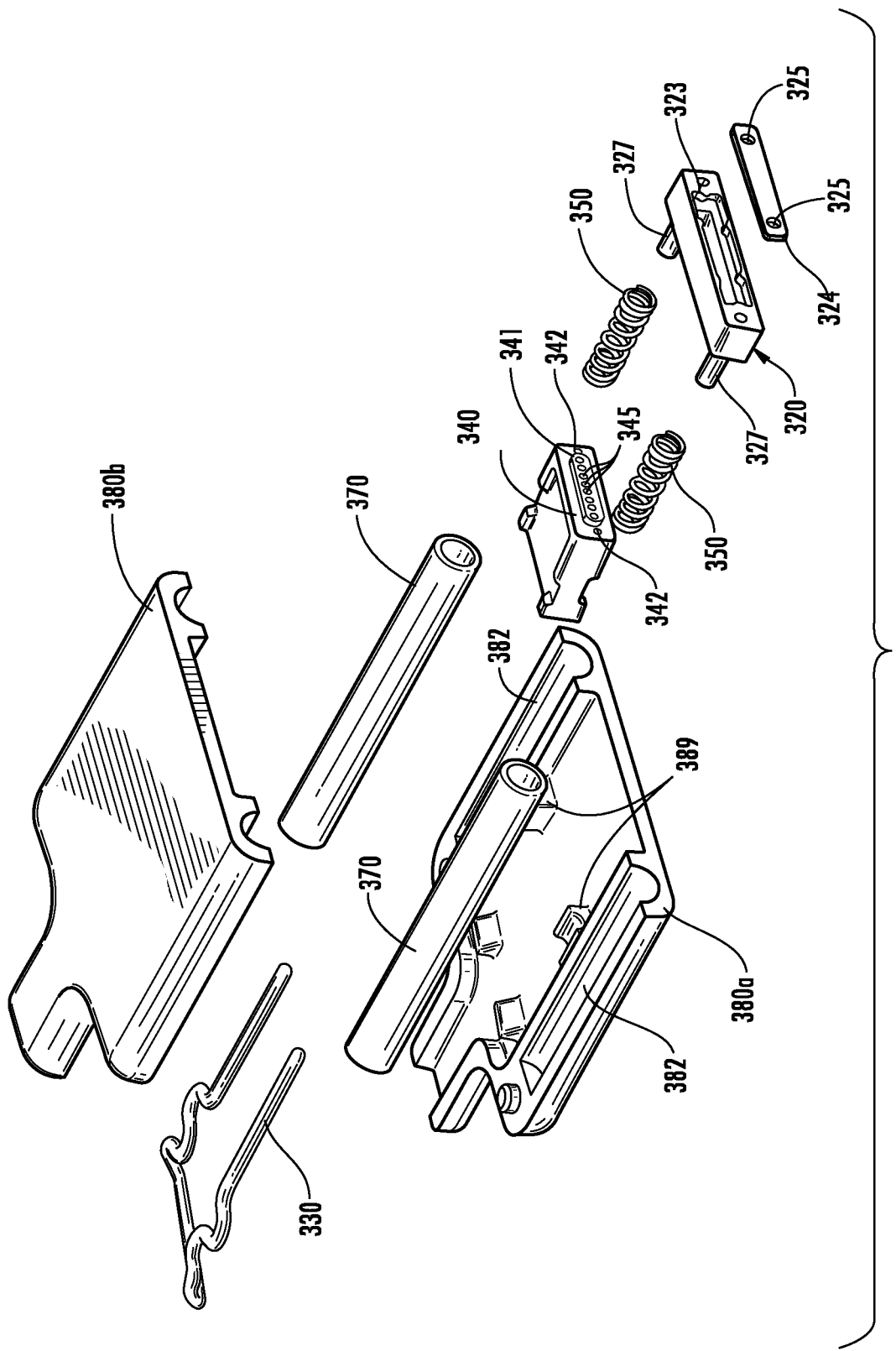

FIGS. 13 and 14 are exploded perspective views of the plug 310. Cover 320 may have any suitable configuration for the given plug design such as including body 322 and window 324 of a suitable shape, size, etc. Like plug 10, the window 324 of the connector may be formed from any suitable material such as a polymer such as Ultem® or Zeonex® or a glass such as a chemically strengthened glass such as available from Corning, Incorporated. Moreover, the window 324 may have a suitable coating such as an anti-reflection coating and/or a scratch-resistant coating as desired. In other embodiments, the cover 320 is formed as a single component. By way of example, the cover 320 may be formed entirely from a polymer that is transmissive to the optical signals. Still other variations and modifications are possible using the concepts disclose herein.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical plug connector, comprising:
   an optical portion having an optical interface including a plurality of lenses; and
   a cover for protecting the optical interface when in both an extended position and a retracted position, wherein:
      the cover can translate toward the optical interface when connecting the optical plug connector and a portion of the cover allows transmission of optical signals therethrough,
      the cover includes a body and a window attached to the body, and
      the window allows the transmission of optical signals therethrough.

2. The optical plug connector of claim 1, further including one or more cover guides, wherein the cover translates using one or more cover guides.

3. The optical plug connector of claim 2, wherein the cover guides are one or more alignment pins and the cover includes one or more bores for receiving the alignment pins.

4. The optical plug connector of claim 1, further including one or more resilient members for biasing the cover toward a forward position.

5. The optical plug connector of claim 4, wherein the one or more resilient members are coil springs.

6. The optical plug connector of claim 1, wherein the optical portion has a nose that engages a cavity of the cover when in a retracted position.

7. The optical plug connector of claim 1, wherein cover includes one or more cover guides.

8. The optical plug connector of claim 1, the window being a chemically-strengthened glass or a polymer.

9. The optical plug connector of claim 1, wherein the cover is formed as single component.

10. The optical plug connector of claim 1, further including one or more electrical contacts.

11. The optical plug connector of claim 10, wherein the cover has one or more recesses that generally conform with a portion of the one or more electrical contacts.

12. The optical plug connector of claim 10, wherein:
the one or more electrical contacts comprises a first electrical contact and a second electrical contact; and
the cover comprises a first concave recess that conforms to a shape of the first electrical contact and a second concave recess that conforms to the a shape of the second electrical contact;
the first concave recess and the second concave recess are located on opposite sides of the cover.

13. The optical plug connector of claim 1, further including a housing.

14. The optical plug connector of claim 1, further including a housing having a first portion and a second portion and one or more electrical contacts, wherein the electrical contacts are secured between the first portion and second portion of the housing.

15. The optical plug connector of claim 1 being a portion of a cable assembly.

16. The optical plug connector of claim 15, further including a housing where a crimp band is secured by a portion of the housing.

17. The optical plug connector of claim 1, wherein the cover may be removed and replaced.

18. An optical plug connector, comprising:
an optical portion having an optical interface;
one or more alignment pins; and
a cover for protecting the optical interface when in both an extended position and a retracted position, the cover includes one or more bores for receiving the one or more alignment pins, wherein:
the cover can translate on the one or more alignment pins toward the optical interface when connecting the optical plug connector and a portion of the cover allows transmission of optical signals therethrough,
the cover includes a body and a window attached to the body, and
the window allows the transmission of optical signals therethrough.

19. The optical plug connector of claim 18, further including one or more resilient members for biasing the cover toward a forward position.

20. The optical plug connector of claim 19, wherein the one or more resilient members are coil springs received on the one or more alignment pins.

21. The optical plug connector of claim 18, wherein the optical portion has a nose that engages a cavity of the cover when in a retracted position.

22. The optical plug connector of claim 18, wherein the cover includes one or more cover guides.

23. The optical plug connector of claim 18, further including one or more electrical contacts.

24. The optical plug connector of claim 23, wherein the cover has one or more recesses that generally conform with a portion of the one or more electrical contacts.

25. The optical plug connector of claim 23, wherein:
the one or more electrical contacts comprises a first electrical contact and a second electrical contact; and
the cover comprises a first concave recess that conforms to a shape of the first electrical contact and a second concave recess that conforms to the a shape of the second electrical contact;
the first concave recess and the second concave recess are located on opposite sides of the cover.

26. The optical plug connector of claim 18, the optical interface including a plurality of lenses integrally formed in the optical portion.

27. The optical plug connector of claim 18, further including a housing.

28. The optical plug connector of claim 18, further including a housing having a first portion and a second portion and one or more electrical contacts, wherein the electrical contacts are secured between the first portion and second portion of the housing.

29. The optical plug connector of claim 18 being a portion of a cable assembly.

30. The optical plug connector of claim 29, further including a housing where a crimp band is secured by a portion of the housing.

31. The optical plug connector of claim 18, wherein the cover may be removed and replaced.

32. An optical plug connector, comprising:
an optical portion having a nose with an optical interface;
a monolithic alignment pin;
a first resilient member;
a second resilient member; and
a cover for protecting the optical interface when in both an extended position and a retracted position, the cover includes a first bore and a second bore for respectively receiving the monolithic alignment pin and a cavity, wherein the cover can translate on the monolithic alignment pin toward the optical interface when connecting the optical plug connector so that the nose engages the cavity of the cover when in a retracted position and the first and second resilient members bias the cover toward a forward position, and a portion of the cover allows transmission of optical signals therethrough.

33. The optical plug connector of claim 32, wherein the first and second resilient members are coil springs.

34. The optical plug connector of claim 32, wherein the cover includes one or more cover guides.

35. The optical plug connector of claim 32, the cover including a body and a window attached to the body, wherein the window allows the transmission of optical signals therethrough.

36. The optical plug connector of claim 32, wherein the cover is formed as single component.

37. The optical plug connector of claim 32, further including one or more electrical contacts.

38. The optical plug connector of claim 37, wherein the cover has one or more recesses that generally conform with a portion of the one or more electrical contacts.

39. The optical plug connector of claim 37, wherein:
the one or more electrical contacts comprises a first electrical contact and a second electrical contact; and
the cover comprises a first concave recess that conforms to a shape of the first electrical contact and a second concave recess that conforms to the a shape of the second electrical contact;
the first concave recess and the second concave recess are located on opposite sides of the cover.

40. The optical plug connector of claim 32, the optical interface including a plurality of lenses integrally formed in the optical portion.

41. The optical plug connector of claim 32, further including a housing.

42. The optical plug connector of claim 32, further including a housing having a first portion and a second portion and one or more electrical contacts, wherein the electrical contacts are secured between the first portion and second portion of the housing.

43. The optical plug connector of claim 32 being a portion of a cable assembly.

44. The optical plug connector of claim 43, further including a housing where a crimp band is secured by a portion of the housing.

45. The optical plug connector of claim 32, wherein the cover may be removed and replaced.

* * * * *

UNITED STATES PATENT AND TRADEMARK OFFICE
CERTIFICATE OF CORRECTION

PATENT NO. : 10,732,361 B2
APPLICATION NO. : 14/976197
DATED : August 4, 2020
INVENTOR(S) : Davide Domenico Fortusini et al.

Page 1 of 1

It is certified that error appears in the above-identified patent and that said Letters Patent is hereby corrected as shown below:

On the Title Page

On page 3, in Column 2, item (56), Other Publications, Line 13, delete "www.cvimelllesgroit.com" and insert -- www.cvimellesgriot.com --, therefor.

In the Claims

In Column 11, Line 14, Claim 12, delete "the a" and insert -- the --, therefor.

In Column 12, Line 3, Claim 25, delete "the a" and insert -- the --, therefor.

In Column 12, Line 61, Claim 39, delete "the a" and insert -- the --, therefor.

Signed and Sealed this
Twenty-second Day of December, 2020

Andrei Iancu
*Director of the United States Patent and Trademark Office*